(12) United States Patent
Aoki et al.

(10) Patent No.: US 7,417,680 B2
(45) Date of Patent: Aug. 26, 2008

(54) DIGITAL VIDEO REPRODUCTION APPARATUS AND METHOD

(75) Inventors: Morio Aoki, Hitachinaka (JP); Kazuto Yoneyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 589 days.

(21) Appl. No.: 10/301,347

(22) Filed: Nov. 20, 2002

(65) Prior Publication Data

US 2003/0133032 A1   Jul. 17, 2003

(30) Foreign Application Priority Data

Jan. 16, 2002   (JP) ............................ 2002-007286

(51) Int. Cl.
*H04N 5/222* (2006.01)
(52) U.S. Cl. ............... 348/333.05; 348/333.01; 348/333.02; 348/333.11
(58) Field of Classification Search ............ 348/207.99, 348/333.01–333.13
See application file for complete search history.

(56) References Cited

U.S. PATENT DOCUMENTS

| | | | | |
|---|---|---|---|---|
| 5,699,089 A | * | 12/1997 | Murray | 715/823 |
| 6,097,389 A | * | 8/2000 | Morris et al. | 715/804 |
| 6,249,316 B1 | * | 6/2001 | Anderson | 348/333.05 |
| 6,389,159 B2 | * | 5/2002 | Gilman et al. | 382/162 |
| 6,445,412 B1 | * | 9/2002 | Shiohara | 348/333.05 |
| 6,618,082 B1 | * | 9/2003 | Hayashi et al. | 348/231.99 |
| 6,700,612 B1 | * | 3/2004 | Anderson et al. | 348/333.11 |
| 6,943,842 B2 | * | 9/2005 | Stavely et al. | 348/333.05 |
| 7,053,951 B2 | * | 5/2006 | Miller et al. | 348/333.05 |
| 2004/0107277 A1 | * | 6/2004 | Levesque et al. | 709/223 |
| 2004/0179115 A1 | * | 9/2004 | Tomat et al. | 348/231.6 |
| 2006/0230334 A1 | * | 10/2006 | Slawson et al. | 715/500.1 |

FOREIGN PATENT DOCUMENTS

JP   10-108122   4/1998

OTHER PUBLICATIONS

*DZ-MV100A Hitachi Instruction Manual* pp. 104-106, Hitachi Ltd. Tokyo Japan (2000).

* cited by examiner

*Primary Examiner*—Nhan T Tran
*Assistant Examiner*—Richard M Bemben
(74) *Attorney, Agent, or Firm*—Townsend and Townsend and Crew LLP

(57) ABSTRACT

The invented apparatus includes a part of measuring the duration of activation of a select button on its control pad. When the select button is activated longer than a predetermined period, the apparatus enters a mode of continuously selecting multiple thumbnails for selecting a plurality of successive thumbnails. During this mode, after selecting a range of successive thumbnails with a cursor positioning mechanism on the control pad, when the select button is activated, it becomes determinate that the thumbnails in the selected range be selected and the apparatus exits the mode of continuously selecting multiple thumbnails.

12 Claims, 14 Drawing Sheets

DOBA : DURATION OF BUTTON ACTIVATION

FIG. 11

LOCATIONS TO WHICH
SELECTED THUMBNAILS
ARE STORED IN INTERNAL
MEMORY WHEN END
POSITION OF SELECTING
MULTIPLE THUMBNAILS
IS SELECTED

| DATA OF THUMBNAIL B | ~134 |
|---|---|
| DATA OF THUMBNAIL G | |
| DATA OF THUMBNAIL H | |
| DATA OF THUMBNAIL I | |
| DATA OF THUMBNAIL J | |
| DATA OF THUMBNAIL K | |
| | |
| | |
| | |
| | |
| | |

LOCATIONS TO WHICH SELECTED THUMBNAILS ARE STORED IN INTERNAL MEMORY WHEN START POSITION IS SELECTED BEFORE CONTINUOUSLY UNSELECTING THE SELECTED THUMBNAILS

DIGITAL VIDEO REPRODUCTION APPARATUS AND METHOD

FIELD OF THE INVENTION

The present invention relates to a digital video reproduction apparatus and, more particularly, to a reproduction technique regarding usability of a digital still camera, digital video camera, and the like, which display a great number of thumbnails.

DESCRIPTION OF THE RELATED ART

Video recording/reproduction apparatus, which has heretofore been available commonly, is, for example, a DVD camera. This camera is equipped with a large-capacity storage medium (a DVD-RAM disk) onto which digital compressed data of moving or still pictures and thumbnail data of initially recorded video images corresponding to the compressed data are stored. An array of thumbnails is displayed from the stored thumbnail data. When the user selects an objective thumbnail from the array of thumbnails displayed, moving picture or still picture data corresponding to the selected thumbnail is retrieved. Then, the user can reproduce the retrieved moving picture or still picture or edit it, such as deleting something from it. The function of retrieving a moving picture or still picture and editing, using the thumbnails is important in simple operation.

In the DVD camera or the like of prior art, a method of selecting a desired thumbnail or thumbnails from the array of thumbnails on display is as follows. To select a single thumbnail, move the cursor to a desired thumbnail with the up, down, left, and right buttons, and the thumbnail at the cursor is selected. Thereafter, depress a replay button to reproduce its full size picture. To select a plurality of successive thumbnails, move the cursor to the first one to select and depress a range select button, and the camera enters a range select mode. Then, move the cursor to the last one to select and depress the range select button again, then a plurality of successive thumbnails in the defined range is selected. An example of this method is described in the "DZ-MV100" User's Manual of a DVD camera supplied by Hitachi, Ltd., pp. 102-103.

A thumbnail selecting part according to another prior art is described in, for example, Kokai (Japanese Unexamined Patent Publication) No. Hei 10-108122 (No. 108122 of 1998). According to this technique, a touch panel is used to display an array of thumbnails, from which one or more thumbnails are selected, using a touch pen. A single thumbnail is selected by simply touching it. A plurality of successive thumbnails can be selected by repeating drag and drop.

SUMMARY OF THE INVENTION

For the above-mentioned DVD camera of prior art, a single thumbnail can be selected effectively, but a plurality of thumbnails cannot be selected. To solve this problem, a select button should be added. After moving the cursor to a desired thumbnail, depress the select button to select it. By repeating this, a plurality of thumbnails can be selected. In this case, however, the range select button is needed to select a plurality of successive thumbnails and the number of buttons increases. For portable small electronic equipment such as the DVD camera, increase of the number of buttons would be regarded as a significant disadvantage.

A problem associated with the above-mentioned technique described in Kokai No. Hei 10-108122 is increase in the price of a DVD camera or the like produced, using this technique, because the touch panel and related function must be added.

It is one object of the present invention to provide a video reproduction technique that allows for selecting a plurality of desired thumbnails from an array of thumbnails on display by simple operation, using an operation control button, without increasing the number of buttons.

It is another object of the present invention to provide a low-priced digital video camera with an easy editing feature.

To achieve the foregoing objects of the invention, and in accordance with a first aspect of the invention, a digital video reproduction apparatus is provided that comprises a thumbnail arraying part, a control pad including a select button to be operated for selecting one or more thumbnails from an array of thumbnails generated by the thumbnail arraying part, a thumbnail selection control part which controls the thumbnail arraying part and selects one or more thumbnails, according to output from the control pad, a display unit which displays thumbnails, and a part of measuring duration of button activation to measure the duration of activation of the select button. When the select button is activated longer than a predetermined period, the digital video reproduction apparatus enters a mode of continuously selecting multiple thumbnails, in which a plurality of successive thumbnails can be selected.

According to a second aspect of the invention, a digital video reproduction apparatus is provided that comprises a reproducing part to reproduce compressed data of digital video signals and thumbnail data corresponding to the compressed data stored on a storage medium, a thumbnail arraying part to generate data for displaying thumbnails in an array on one screen page from the thumbnail data from the reproducing part, a video signal processor which converts the data for displaying thumbnails in an array from the thumbnail arraying part into analog video signals, a display unit which displays an array of thumbnails from the analog video signals, a control pad including a select button to be operated for selecting one or more thumbnails from the array of thumbnails displayed, an operation control part to handle request from the control pad, a thumbnail selection control part to exert control of thumbnail selection from the array of thumbnails under control from the operation control part, and a part of measuring duration of button activation to measure the duration of activation of the select button. When the select button is activated longer than a predetermined period, the digital video reproduction apparatus enters the mode of continuously selecting multiple thumbnails, in which a plurality of successive thumbnails can be selected.

In the first or second aspect of the invention, during the mode of continuously selecting multiple thumbnails, after selecting a range of successive thumbnails by setting starting and end cells of thumbnails, using a cursor positioning mechanism on the control pad, when the select button is activated again, it becomes determinate that the thumbnails in the selected range be selected and the digital video reproduction apparatus exits the mode of continuously selecting multiple thumbnails. In the first or second aspect of the invention, when the select button is activated longer than a predetermined period with a cursor positioned at a selected thumbnail, the digital video reproduction apparatus enters a mode of continuously unselecting thumbnails for unselecting successive thumbnails that have been selected. During the mode of continuously unselecting thumbnails, after selecting a range of successive thumbnails by setting starting and end cells of thumbnails, using a cursor positioning mechanism on the control pad, when the select button is activated again, it becomes determinate that the selected thumbnails in the selected range be unselected and the digital video reproduction apparatus exits the mode of continuously unselecting thumbnails.

The present invention enables selecting a plurality of successive thumbnails by simple operation without increasing the number of buttons. Similarly, the invention enables unselecting a plurality of successive thumbnails that have been selected.

These and other objects, features and advantages of the invention will be apparent from the following more particular description of preferred embodiments of the invention, as illustrated in the accompanying drawings.

BRIEF DESCRIPTION OF THE DRAWINGS

FIG. 11 illustrates the internal memory contents at the end of continuously selecting thumbnails.

DESCRIPTION OF THE PREFERRED EMBODIMENTS

In the following, a preferred embodiment of the present invention will be described with reference to the accompanying drawings to illustrate how the invention is carried out.

Figure 1:
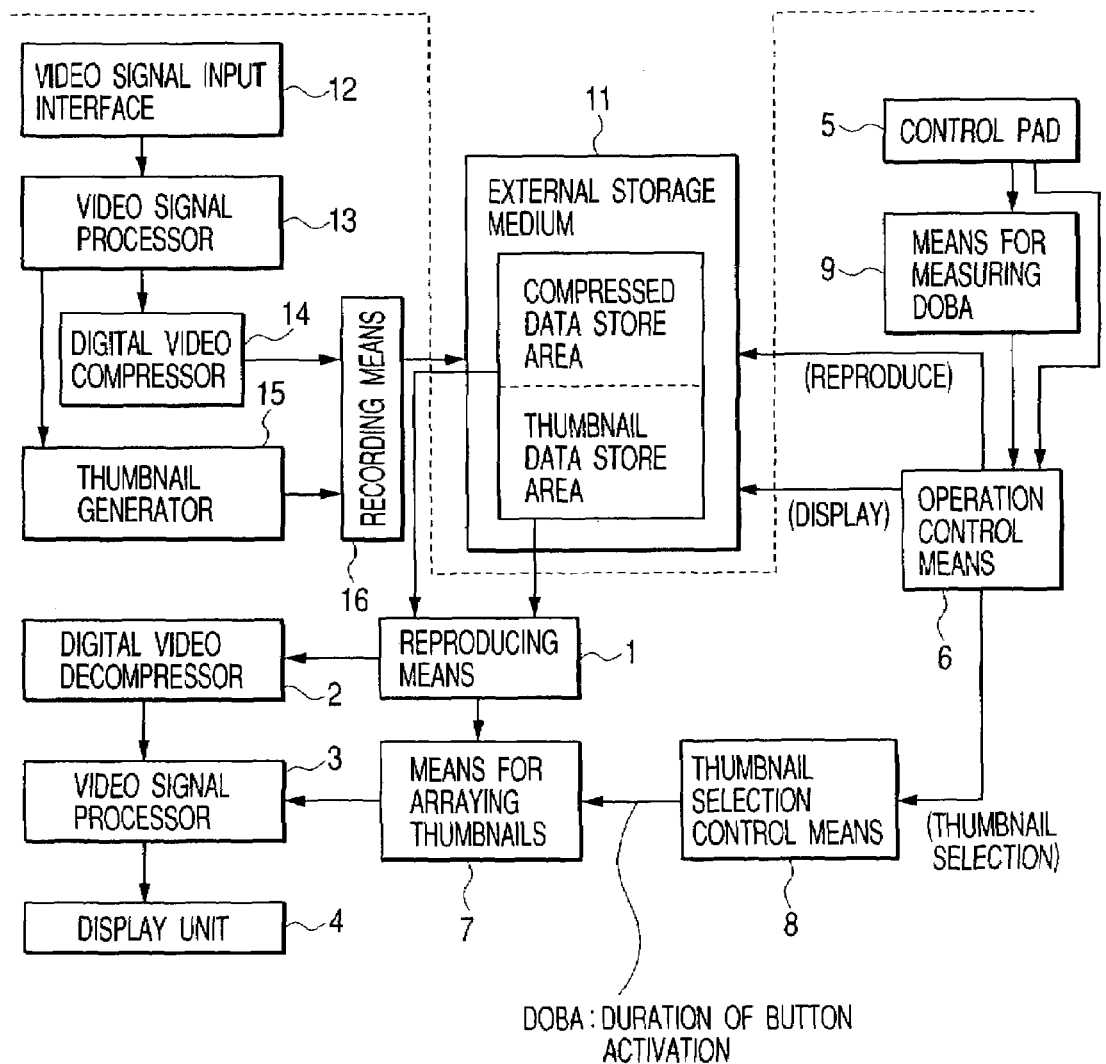
FIG. 1 is a diagram showing a configuration example of a digital video recording/reproduction apparatus according to a preferred embodiment 1 of the present invention.

FIG. 1 is a diagram showing a configuration example of a digital video recording/reproduction apparatus according to a preferred embodiment 1 of the present invention. This embodiment is an instance of application of the invention to a VDV camera. The digital video recording/reproduction apparatus (which will be referred to as the apparatus, hereinafter) illustrated in FIG. 1 comprises the following: a reproducing part 1 to reproduce data and thumbnail data from a storage medium; a digital video decompressor 2 to decompress compressed data retrieved from the storage medium; a video signal processor 3 to perform necessary steps of signal processing as well as converting decompressed video data and thumbnail data from which an array of thumbnails is displayed into analog video signals; a display unit 4 for displaying video images reproduced from the analog video signals; a control pad 5 which includes a select button allowing the user to select a thumbnail or thumbnails from an array of thumbnails displayed; an operation control part 6 to execute a sequence of actions in response to user input through the control pad 5; a thumbnail arraying part 7 to generate data for displaying thumbnails in an array on one screen page from thumbnail data; a thumbnail selection control part 8 to exert control of thumbnail selection from an array of thumbnails generated under control from the operation control part 6; a part of measuring duration of button activation 9 to measure the duration of activation (depression) of the select button present on the control pad 5; an external storage medium 11 to store digital compressed video data and thumbnail data; a video signal input interface 12; a video signal processor 13 to perform necessary steps of signal processing including converting video signals into digital signals; a digital video compressor 14 to compress digital video signals into compressed data; a thumbnail generator 15 to generate thumbnail data; and a recording part 16 to store compressed video data and thumbnail data onto the storage medium.

The apparatus displays an array of thumbnails allowing the user to select a thumbnail or thumbnails from the array, which will be explained in outline. In response to predetermined operation of the control pad 5 by the user, thumbnail data is retrieved from the external storage medium 11 under the control of the operation control part 6. The thumbnail data is passed through the reproducing part 1 to the thumbnail arraying part 7. An array of thumbnails is generated by the thumbnail arraying part 7, passed through the video signal processor 3 to the display unit 4, and displayed. When the user performs predetermined operation of the control pad 5, while viewing the array of thumbnails displayed on the screen, the operation control part 6 passes control to the thumbnail selection control part that controls the thumbnail arraying part 7 and the display of the thumbnails. Thereby, a single thumbnail or a plurality of thumbnails that are user desired can be selected. When the user continues to depress the select button on the control pad 5 for a period (for example, 3 seconds) the part of measuring duration of button activation 9 determines that the button is being activated longer than a preset criterion period (for example, 2 seconds). This puts the apparatus into the mode of continuously selecting multiple thumbnails, allowing the user to select a plurality of successive thumbnails. Selecting a series of thumbnails at a time makes later edit operation easy.

When the apparatus is recording video, analog video signals input through the video signal input interface 12 are converted into digital signals and subjected to necessary signal processing by the video signal processor 13. The digital video compressor 14 compresses the digital signals into compressed data that is, in turn, stored into the external storage medium 11 by the recording part 16. The digital signals from the video signal processor 13 are also supplied to the thumbnail generator 15 where thumbnails of initially recorded video images are generated as thumbnail data. Together with the compressed data, the thumbnail data is stored into the external storage medium 11 by the recording part 16. The external recording medium 11 has both compressed data store area and thumbnail data store area so that each type of data can be recorded or reproduced separately.

Using FIGS. 2 and 3, how to select a thumbnail will be explained below.

Figure 2B:
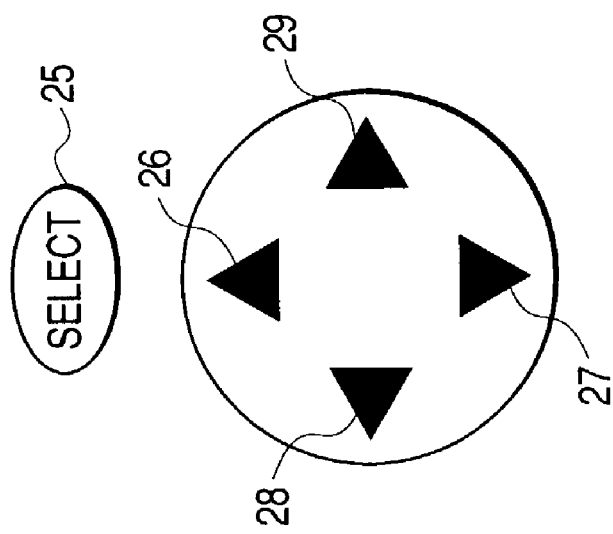
FIG. 2B shows a front view of examples of buttons to be used for selecting thumbnails, which are part of the buttons provided on the control pad.
Figure 2A:
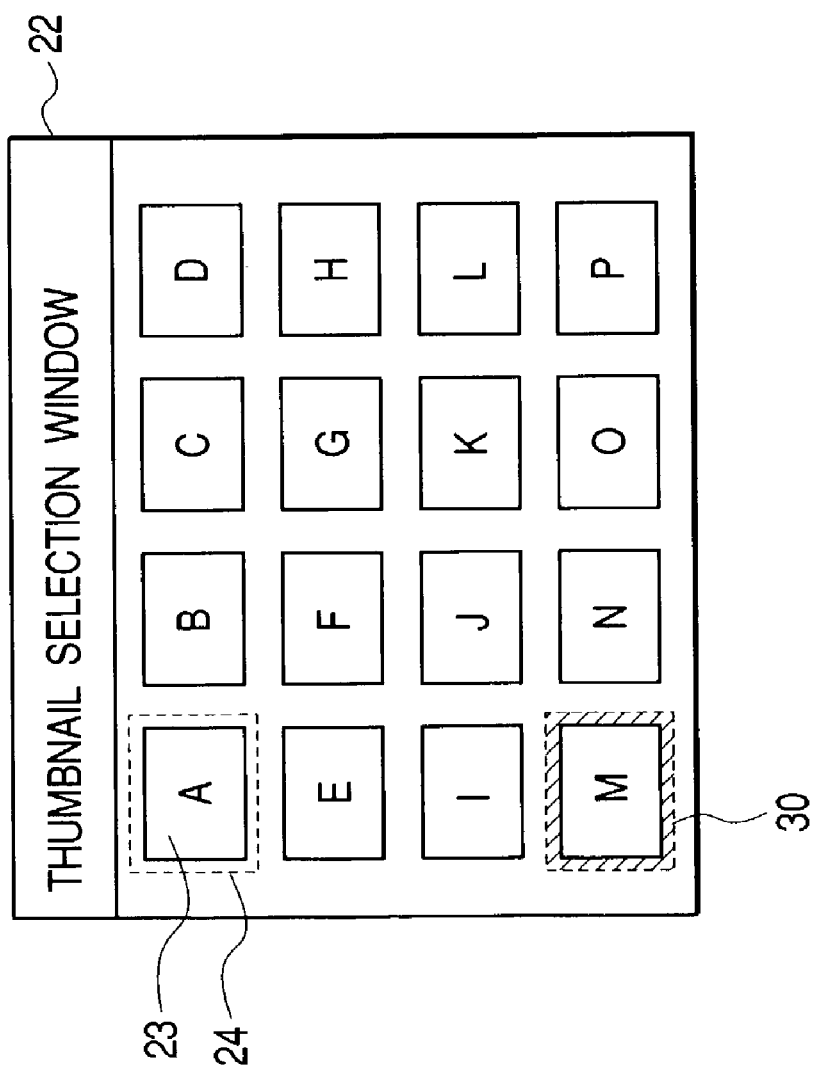
FIG. 2A shows a front view of the display unit presenting an exemplary thumbnail selection window according to a preferred embodiment of the invention.

FIG. 2A shows a front view of the display unit presenting an exemplary thumbnail selection window according to a preferred embodiment of the invention. FIG. 2B shows a front view of examples of buttons to be used for selecting thumbnails, which are part of the buttons provided on the control pad. In this window example presented on the display unit 4, a single thumbnail is selected, using the buttons of FIG. 2B.

Referring to FIG. 2A, a user operation procedure of selecting one thumbnail from an array of thumbnails displayed will be described. On the window 22 displaying an array of thumbnails, the cursor 24 is initially positioned at thumbnail A 23 surrounded by dotted lines.

As is shown in FIG. 2B, on the control pad 5, there are the select button 25 and cursor buttons: up 26, down 27, left 28, and right 29. In this example, thumbnail M 30 is selected (already).

In the present embodiment, as part to indicate a selected thumbnail, framing the thumbnail with a color frame is performed to indicate that it is selected (already); for example, like the selected thumbnail M 30.

By way of example, the procedures for selecting the thumbnail A 23 and unselecting the thumbnail M 30 will be explained. When selecting the thumbnail A 23 from the array of thumbnails displayed on the window 22, position the cursor 24 that indicates the target thumbnail at the thumbnail A 23 as shown. Then, depress the select button 25 once. When the thumbnail A 23 is selected, it is framed with a color frame. When the user wants to select another thumbnail consecutively, move the cursor 24 to a desired thumbnail, using the up, down, left, and right cursor buttons 26, 27, 28, and 29, and depress the select button 25. Then, the desired thumbnail is selected.

To unselect the selected thumbnail M 30, move the cursor to the thumbnail M and depress the select button once. Then, the thumbnail M is unselected and the color frame around it disappears.

Figure 3B:
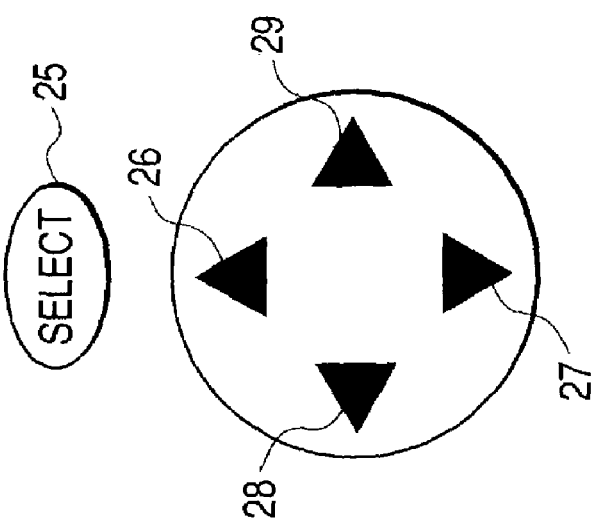
FIG. 3B shows a front view of examples of buttons to be used for selecting thumbnails, which are part of the buttons provided on the control pad.
Figure 3A:
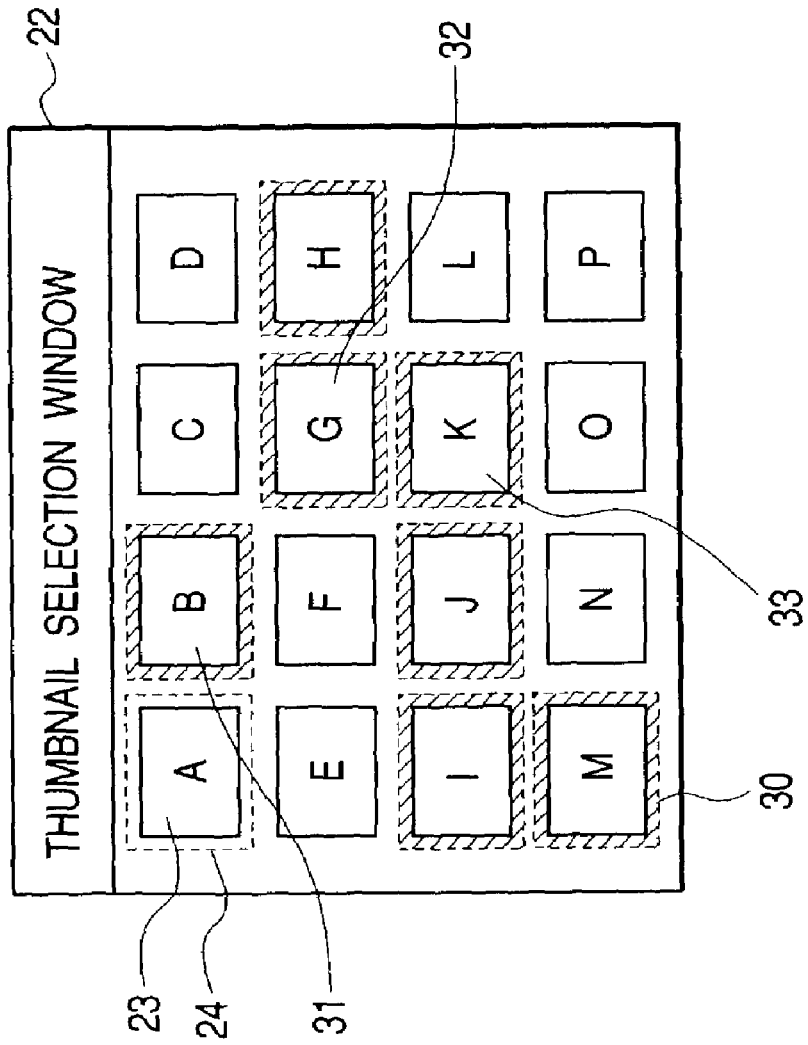
FIG. 3A shows a front view of the display unit presenting an exemplary thumbnail selection window according to a preferred embodiment of the invention, wherein successive thumbnails are selected.

FIG. 3A shows a front view of the display unit presenting an exemplary thumbnail selection window according to a preferred embodiment of the invention, wherein successive thumbnails are selected. FIG. 3B shows a front view of examples of buttons to be used for selecting thumbnails, which are part of the buttons provided on the control pad. In this window example presented on the display unit 4, a plurality of thumbnails are selected, using the buttons of FIG. 3B. The components corresponding to those shown in FIG. 2 are assigned the same reference numbers and their explanation is not repeated.

FIG. 3A is provided for explaining a user operation procedure of selecting a plurality of thumbnails from the array of thumbnails displayed on the window 22. As FIG. 3A shows, assume that the user selects thumbnail B and successive thumbnails from thumbnail G 32 to thumbnail K 33. FIG. 3B is the same as FIG. 2B and its explanation is not repeated.

By way of example, the procedure for selecting the thumbnail B and continuously selecting the thumbnails G 32 through K 33 will be explained. Because the cursor 24 is now positioned at the thumbnail A 23, press the right cursor button 29 once to move the cursor 24 to the thumbnail B 31. Depress the select button 25 once, then the thumbnail B 31 is selected and framed with a color frame as shown.

Depress the right cursor button 29 once and depress the down cursor button 27 once to move the cursor 24 to the thumbnail G 32. Next, depress the select button 25 for a period (for example, 2 seconds). Then, the apparatus enters the mode of continuously selecting multiple thumbnails and the selected thumbnail G 32 is fixed as the start position of selecting successive thumbnails. Further, depress the right cursor button 29 four times to move the cursor 24 to the thumbnail K 33 and depress the select button 25 once. Then, the thumbnails G, H, I, J, K from the G one 32 to the K one 33 are selected and the apparatus exits the mode of continuously selecting multiple thumbnails. During the continuously selecting mode, by making the color of the frames of thumbnails as candidates to be selected continuously different from the color of the frames of selected thumbnails, a clear distinction between the selection candidate thumbnails and the selection fixed thumbnails can be made.

In an alternative procedure of selecting the successive thumbnails from the G one 32 to the K one 33, it may be possible to depress the down cursor button 27 once when the cursor is positioned at the thumbnail G. This moves the cursor 24 to the thumbnail K 33. Then, depress the select button 25, and the G and K thumbnails and in-between thumbnails H, I, and J are selected. Further, depress the right cursor button 29 twice, then the cursor moves to the thumbnail M. Depress the select button 25 once, and the thumbnail M is selected.

Alternatively, the following may be possible. After putting the apparatus into the continuously selecting mode by depressing the select button 25 longer than a predetermined period, move the cursor 24 to the starting cell of thumbnail and depress the select button. Move the cursor 24 to the end cell of thumbnail and depress the select button 25. Then, the thumbnails in the range from the starting cell to the end cell are selected.

By way of example, the procedure for continuously unselecting the selected thumbnails from the G one 32 to the K one 33 will be explained. First, move the cursor to the thumbnail G 32 and depress the select button 25 longer than a predetermined period. Then, the apparatus changes to the mode of continuously unselecting thumbnails and the thumbnail G 32 is selected as the starting position of unselecting successive thumbnails. Move the cursor 24 to the thumbnail K 33 and depress the select button 25 once. Thereby, the selected successive thumbnails G, H, I, J, and K are unselected and the apparatus exits the mode of continuously unselecting thumbnails.

FIGS. 4, 5, 7, 9, and 12 are flowcharts illustrating the processes to be carried out by the internal part of the apparatus in response to user action of selecting a single thumbnail or a plurality of successive thumbnails by operating the buttons shown in FIGS. 2 and 3. The internal part are the part of measuring duration of button activation 9, operation control part 6, and thumbnail selection control part 8, one of which executes a particular step of these flowcharts, and which will be referred to as an internal controller hereinafter for explanatory purposes. FIGS. 6, 8, 10, 11, 13, and 14 show how the contents of the internal memory (not shown) in which selected thumbnail data is stored change, according to the processes.

Using FIGS. 4 through 14, apparatus-internal thumbnail selection procedures in different phases will be explained below.

Figure 4:
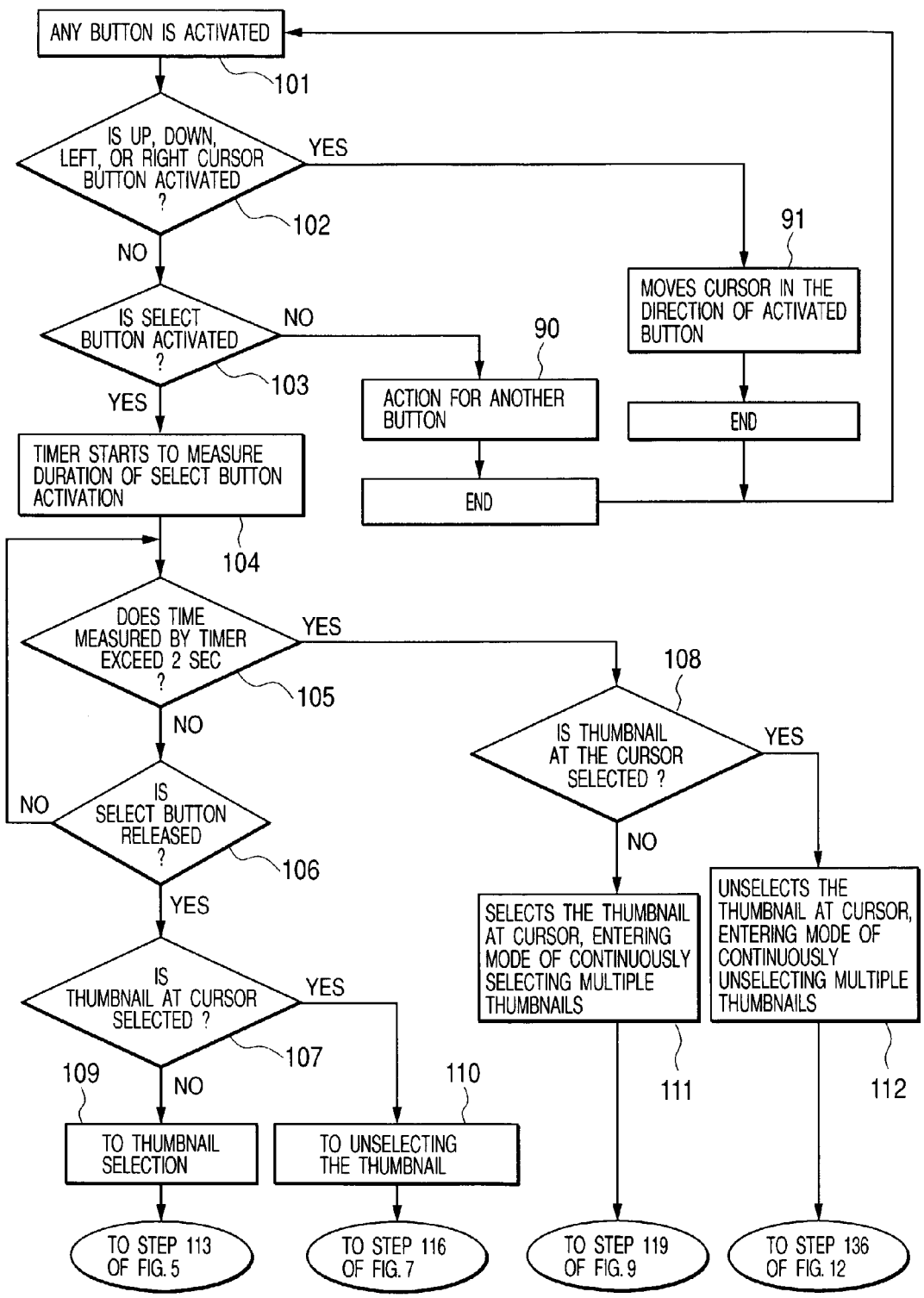
FIG. 4 is a flowchart illustrating an apparatus-internal thumbnail selection procedure according to a preferred embodiment of the invention.

FIG. 4 is a flowchart illustrating an apparatus-internal thumbnail selection procedure according to a preferred embodiment of the invention. Referring to FIG. 4, when any button is activated (depressed) at step 101, in step 101, it is determined whether the up, down, left, or right cursor button is activated. If any of the up, down, left, and right cursor buttons 26, 27, 28, and 29 is activated, the procedure proceeds to step 91 where the internal controller moves the cursor in the direction of the activated button. Upon the completion hereof, the procedure returns to the step 101 for further button activation. If it is determined in the step 102 that none of the up, down, left, and right cursor buttons 26, 27, 28, and 29 are activated, then, step 103 of determining whether the select button 25 is activated is executed. If it is determined in the step 103 that any button other than the select button 25 and cursor buttons is activated, the procedure proceeds to step 90 where the internal controller performs action for another button. Upon the completion hereof, the procedure returns to the step 101 for further button activation.

If it is determined in the step 103 that the select button 25 is activated, the internal controller starts the timer for measuring the duration of select button activation in step 104. In the next step 105, it is determined whether the time measured by the timer exceeds a predetermined period, for example, two seconds. If it is determined in the step 105 that the measured time is within two seconds, in step 106 it is determined whether the select button 25 is released. Unless the select button is released, the procedure returns to the step 105. If the select button is released, it is determined whether a signal thumbnail is selected; that is, in step 107, it is determined whether the thumbnail at the current cursor position is selected. Two ways to go diverge. If it is determined that the thumbnail is not selected, the procedure proceeds to step 109 to select the single thumbnail. If it is determined that the thumbnail is already selected, the procedure proceeds to step 110 to unselect the selected single thumbnail. To select the single thumbnail, the procedure proceeds from the step 109 to step 113 of FIG. 5.

Figure 5:
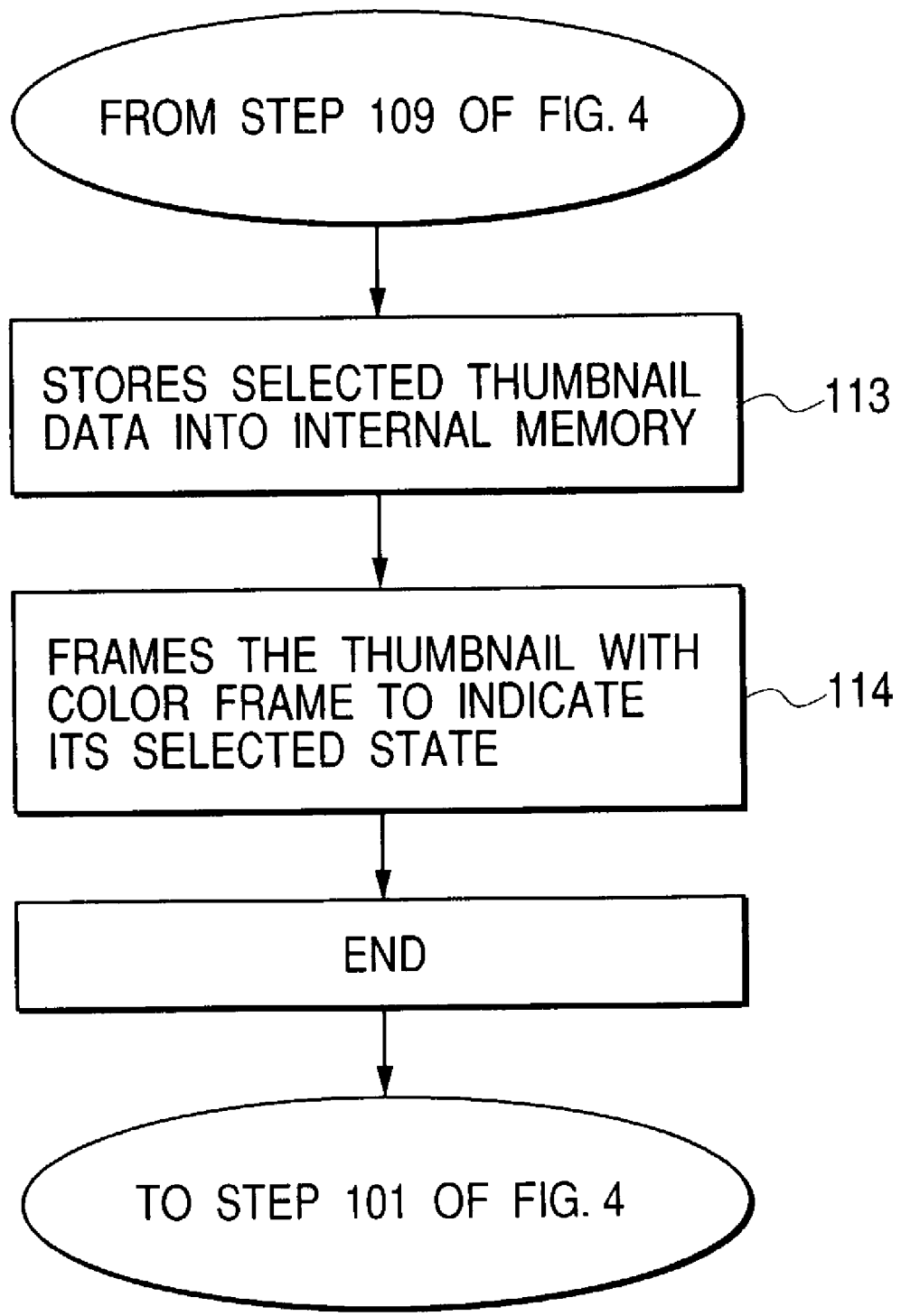
FIG. 5 is a flowchart illustrating an apparatus-internal procedure of selecting a single thumbnail according to a preferred embodiment of the invention.

FIG. 5 is a flowchart illustrating an apparatus-internal procedure of selecting a single thumbnail according to a preferred embodiment of the invention. When selecting a single thumbnail in the step 109 of FIG. 4, the procedure proceeds to the step 109 of FIG. 5 where the internal controller, namely, the thumbnail selection control part 8 stores the data of the user-selected thumbnail into its internal memory (not shown). In step 114, the internal controller frames the thumbnail with a color frame to indicate the selected state of the thumbnail. The procedure returns to the step 101 of FIG. 4 for further button activation. If the selected thumbnail is, for example, thumbnail B 31, the data 115 of the selected thumbnail B is stored into the internal memory in the step 113, as is shown in FIG. 6.

Figure 6:
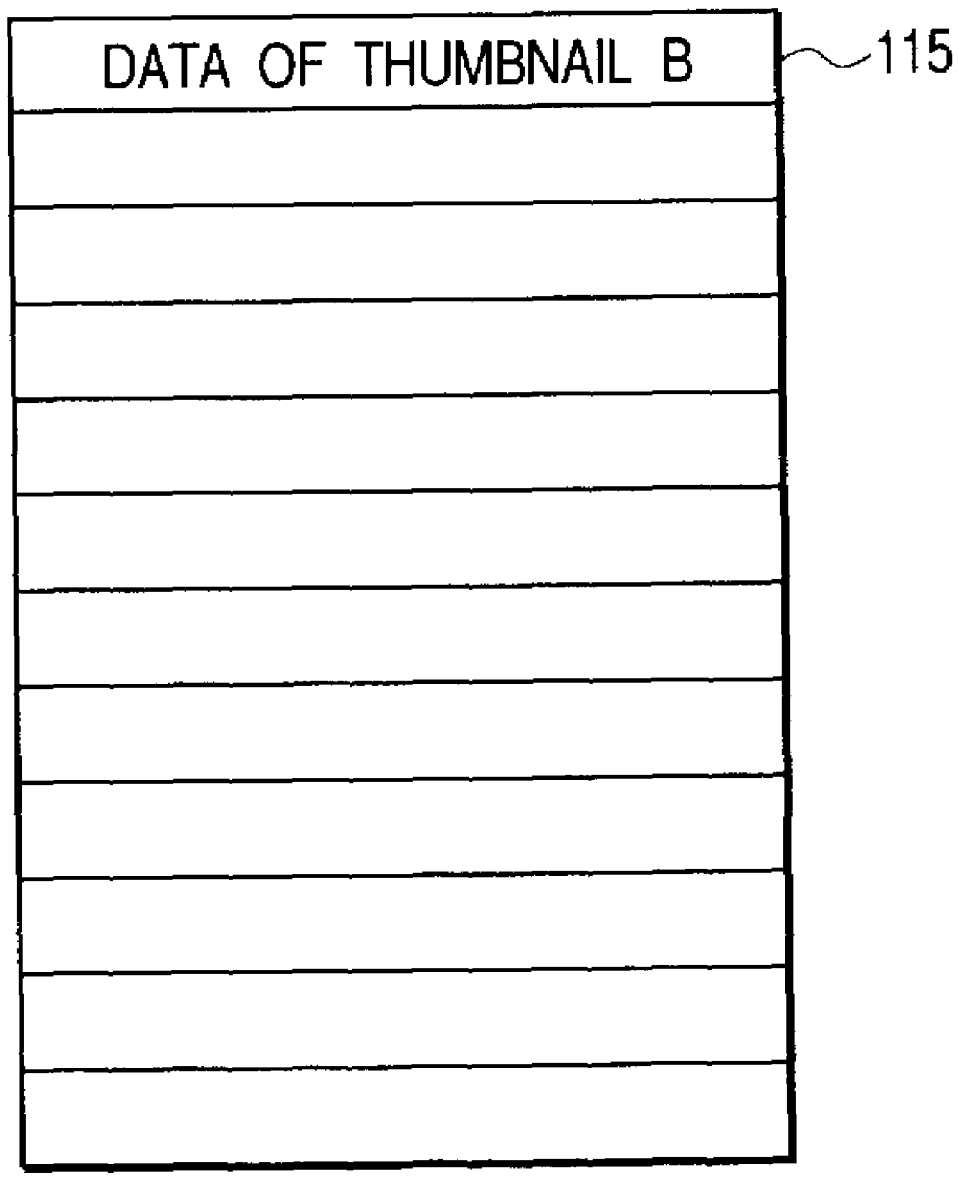
FIG. 6 illustrates the internal memory contents after a single thumbnail is selected.

FIG. 6 illustrates the internal memory contents after a single thumbnail is selected.

Figure 7:
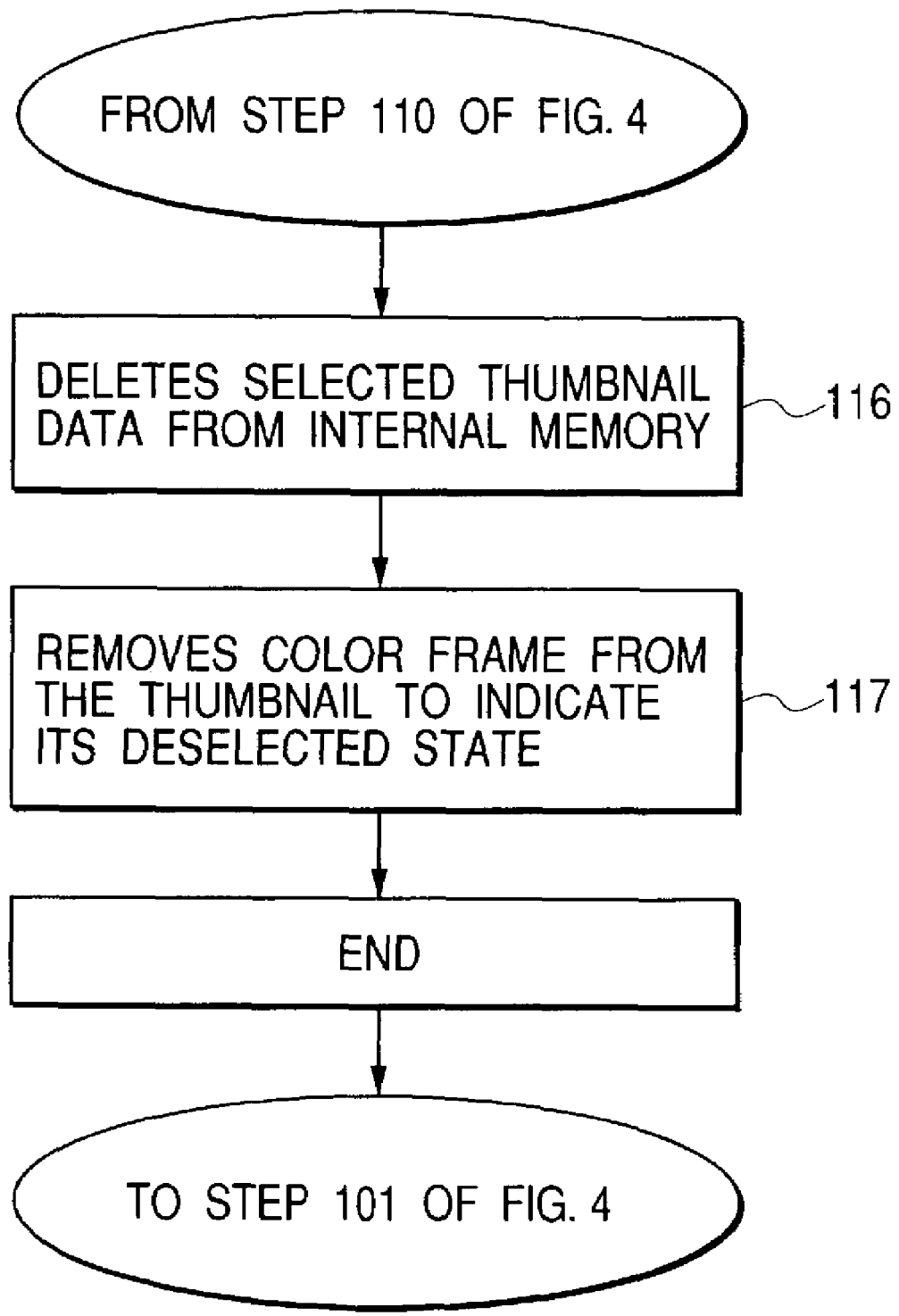
FIG. 7 is a flowchart illustrating an apparatus-internal procedure of unselecting a single thumbnail according to a preferred embodiment of the invention.

When unselecting an already selected single thumbnail in the step 110 of FIG. 4, the procedure proceeds to the step 116 of FIG. 7.

FIG. 7 is a flowchart illustrating an apparatus-internal procedure of unselecting a single thumbnail according to a preferred embodiment of the invention. When unselecting the selected single thumbnail in the step 110 of FIG. 4, the procedure proceeds to the step 116 where the internal controller deletes the data of the selected thumbnail from the internal memory. In step 117, the internal controller removes the color frame from the thumbnail to indicate the deselected state of the thumbnail. The procedure returns to the step 101 of FIG. 4 for further button activation. In consequence, the data of thumbnail B stored as shown in FIG. 6 is deleted and the internal memory becomes empty 118, as is shown in FIG. 8.

Figure 8:
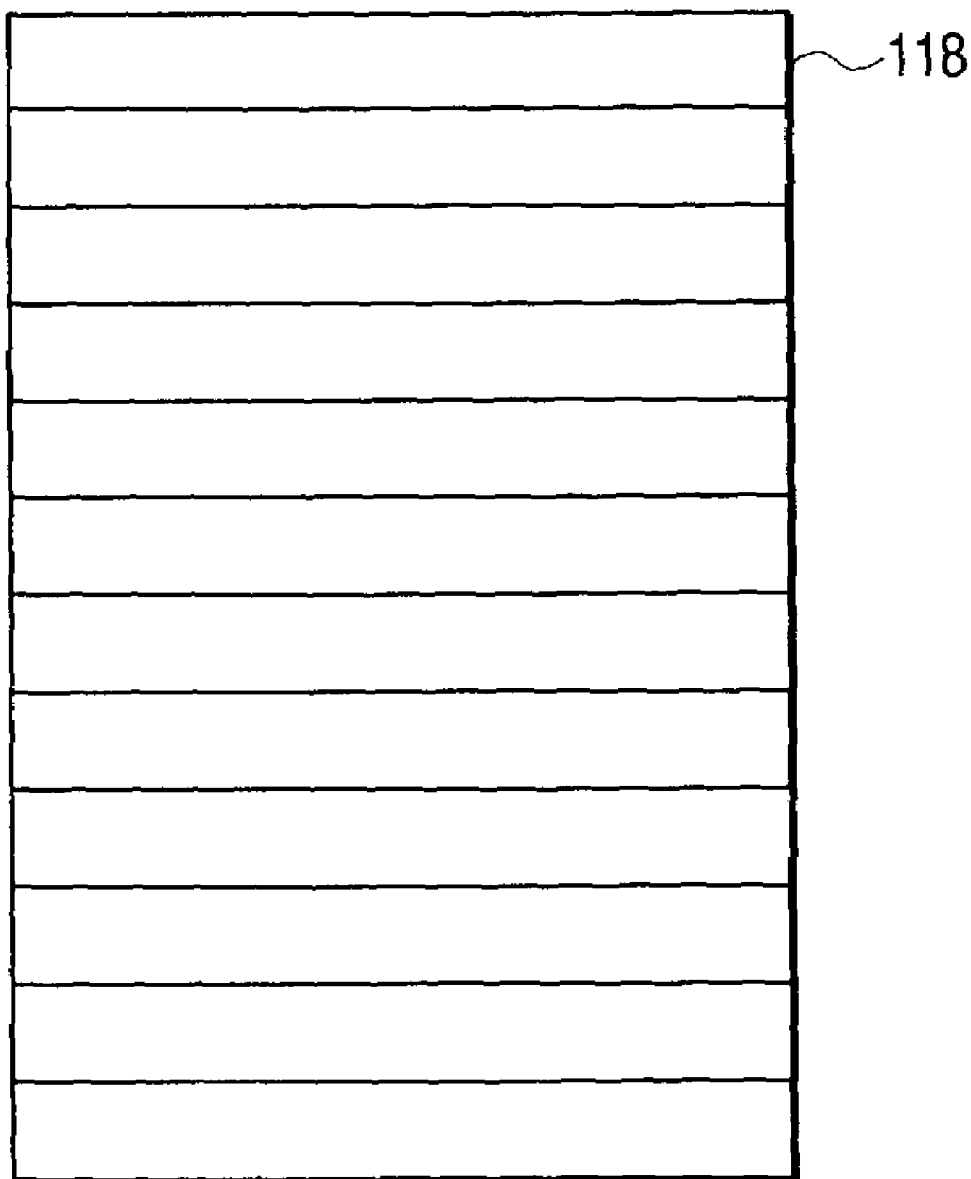
FIG. 8 illustrates the internal memory that is empty when a selected single thumbnail has been unselected.

FIG. 8 illustrates the internal memory that is empty when a selected single thumbnail has been unselected.

In the step 105 of FIG. 4, if the time measured by the timer exceeds a predetermined period, for example, two seconds, the procedure proceeds to step 108 of selecting successive thumbnails. In the step 108, it is determined whether the thumbnail at the cursor is selected. If the thumbnail is not selected, step 111 is executed to select thumbnails continuously. If the thumbnail is selected, the procedure proceeds to step 112 to unselect thumbnails continuously.

When selecting thumbnails continuously in the step 111 of FIG. 4, the procedure proceeds to step 119 of FIG. 4.

Figure 9:
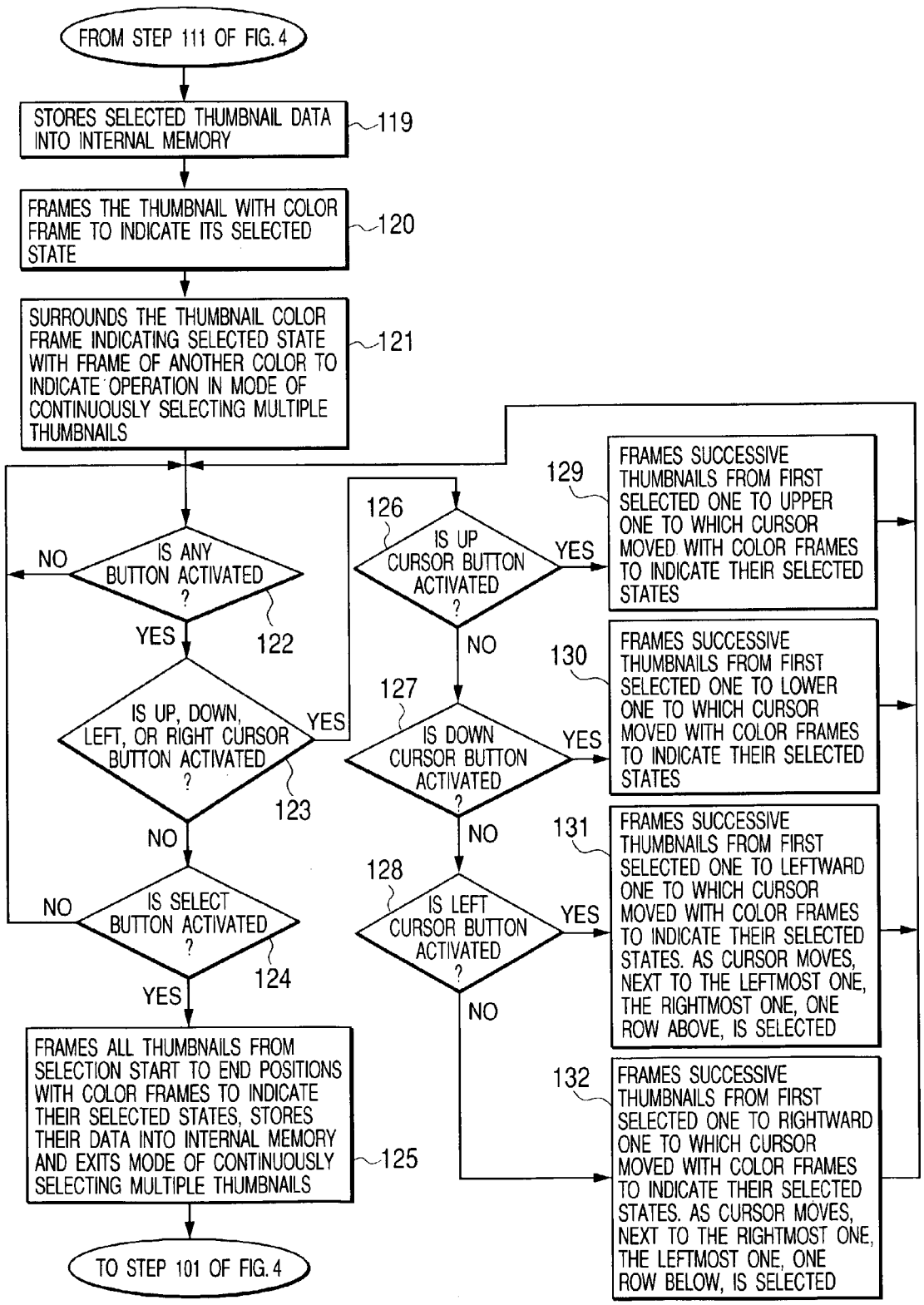
FIG. 9 is a flowchart illustrating an apparatus-internal procedure of continuously selecting thumbnails arranged in successive order.

FIG. 9 is a flowchart illustrating an apparatus-internal procedure of continuously selecting thumbnails arranged in successive order. When the apparatus enters the mode of continuously selecting multiple thumbnails in the step 111 of FIG. 4, the procedure proceeds to the step 119 where the internal controller stores the data of the user-selected thumbnail into the internal memory. In step 120, the internal controller frames the thumbnail with a color frame to indicate the selected state of the thumbnail. In step 121, the internal controller surrounds the thumbnail color frame Indicating the selected state with a frame of another color to indicate operation in the mode of continuously selecting multiple thumbnails. In step 122, the internal controller awaits button activation in the mode of continuously selecting multiple thumbnails. If it is determined in the step 122 that any button is activated, in step 123 it is determined whether the up, down, left, or right cursor button or another button is activated. If it is determined in the step 123 that any of the up, down, left, and right cursor buttons 26, 27, 28, and 29 is activated, the procedure proceeds to steps 126, 127, and 128 to determine what cursor button is activated.

If the down cursor button 27 is activated, after the step 126 where it is determined that the up cursor button is not activated, in the step 127 it is determined that the down cursor button is activated. Then, the procedure proceeds to step 130 in response to the activated down cursor button. In the step 130, the internal controller frames successive thumbnails from the first selected one to a lower one to which the cursor moved with color frames to indicate the selected states of the thumbnails. Upon the completion hereof, the procedure returns to the step 122 for further button activation. If the up cursor button 26 is activated, it is determined in the step 126 that the up cursor button is activated and the procedure proceeds to step 129 in response to the activated up cursor button. In the step 129, the internal controller frames successive thumbnails from the first selected one to an upper one to which the cursor moved with color frames to indicate the selected states of the thumbnails. Upon the completion hereof, the procedure returns to the step 122 for further button activation. If the left cursor button 28 is activated, after the steps 126 and 127 where it is respectively determined that the up and down cursor buttons are not activated, in the step 128 it is determined that the left cursor button is activated. Then, the procedure proceeds to step 131 in response to the activated left cursor button. In the step 131, the internal controller frames successive thumbnails from the first selected one to a leftward one to which the cursor moved with color frames to indicate the selected states of the thumbnails. Upon the completion hereof, the procedure returns to the step 122 for further button activation. In relation to the step 131, as the cursor moves, next to the leftmost one, the rightmost one, one row above, is selected. If the right cursor button 29 is activated, after the steps 126 and 127 where it is respectively determined that the up and down cursor buttons are not activated, in the step 128 it is determined that the left cursor button is not activated. Thus, the procedure proceeds to step 132 in response to the activated right cursor button. In the step 132, the internal controller frames successive thumbnails from the first selected one to a rightward one to which the cursor moved with color frames to indicate the selected states of the thumbnails. Upon the completion hereof, the procedure returns to the step 122 for further button activation. In relation to the step 132, as the cursor moves, next to the rightmost one, the leftmost one, one row below, is selected.

If it is determined in the step 123 that none of the up, down, left, and right cursor buttons 26, 27, 28, and 29 are activated, the procedure proceeds to step 124 where it is determined whether the select button 25 is activated. If it is determined in the step 124 that the select button 25 is not activated, the procedure returns to the step 122 for further button activation. If it is determined in the step 124 that the select button 25 is activated, step 125 is executed. In the step 125, the internal controller frames all thumbnails from selection start to end positions with color frames to indicate the selected thumbnails, stores their data into the internal memory, removes the outer color frame indicating the mode of continuously selecting multiple thumbnails, and exits this mode. Then, the procedure returns to the step 101 of FIG. 4 for further button activation.

In the following, what is executed in the phase of the step 122 and subsequent with regard to an illustrative case where thumbnails G 32 through K 33 are selected will be explained. When the cursor moves from the thumbnail G 32, the start position of selection, to the thumbnail K 33, one row below, by the activation of any of the up, down, left, and right cursor buttons 26, 27, 28, and 29, the range of thumbnails to be selected continuously is set; that is, the successive thumbnails from the G one 32 to the K one 33 are framed with color frames that indicate the candidates to be selected continuously. When the select button 25 is then activated, the procedure proceeds to the step 124 where it is determined that the select button is activated, proceeds to the step 125 where selecting the thumbnails is completed, and returns to the step 101 of FIG. 4 for further button activation.

Figure 10:
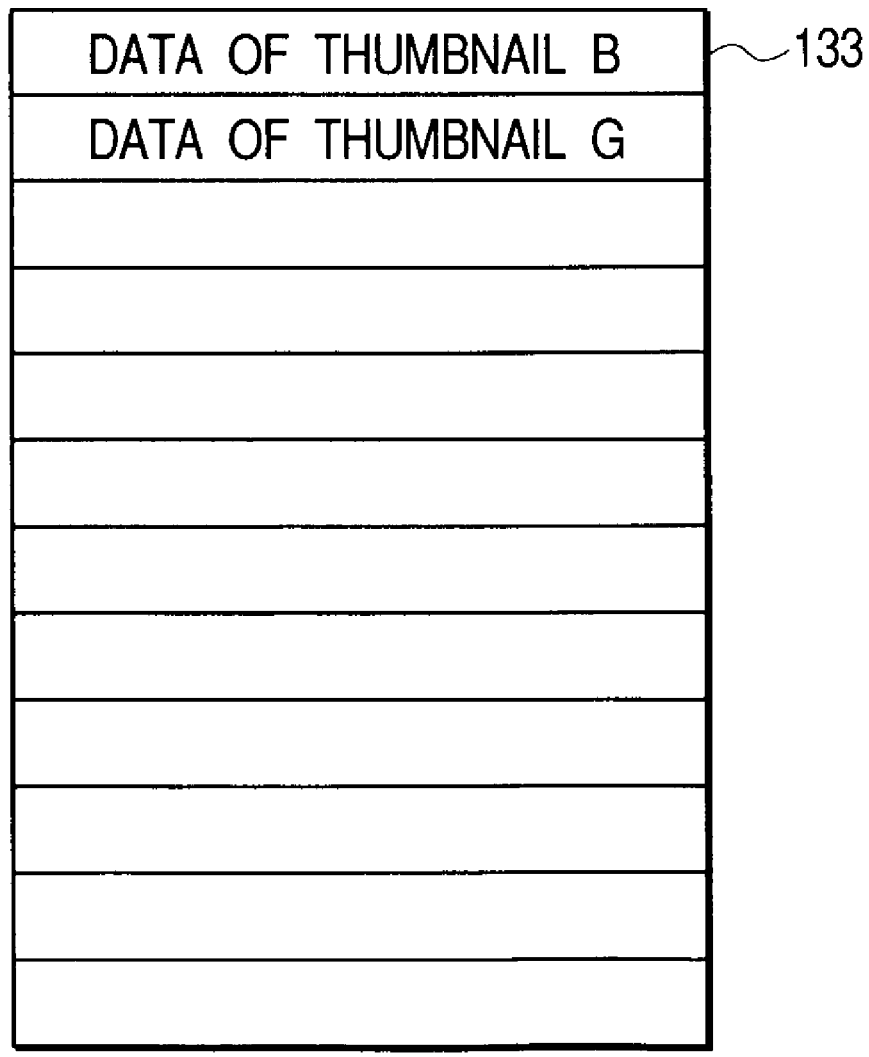
FIG. 10 illustrates the internal memory contents at the start of continuously selecting thumbnails.

FIG. 10 illustrates the internal memory contents at the start of continuously selecting thumbnails. When the thumbnail G 32 is selected as the start position of continuously selecting multiple thumbnails, its data 119 is stored into the internal memory managed by the thumbnail selection control part 8. As shown in FIG. 10, the data of the thumbnail B has already been stored before storing the thumbnail G data.

FIG. 11 illustrates the internal memory contents at the end of continuously selecting thumbnails. When successive thumbnails from the G one 32 at the start position of continuously selecting multiple thumbnails to the K one 33 at the end position are selected, their data 134 is stored into the internal memory.

Figure 12:
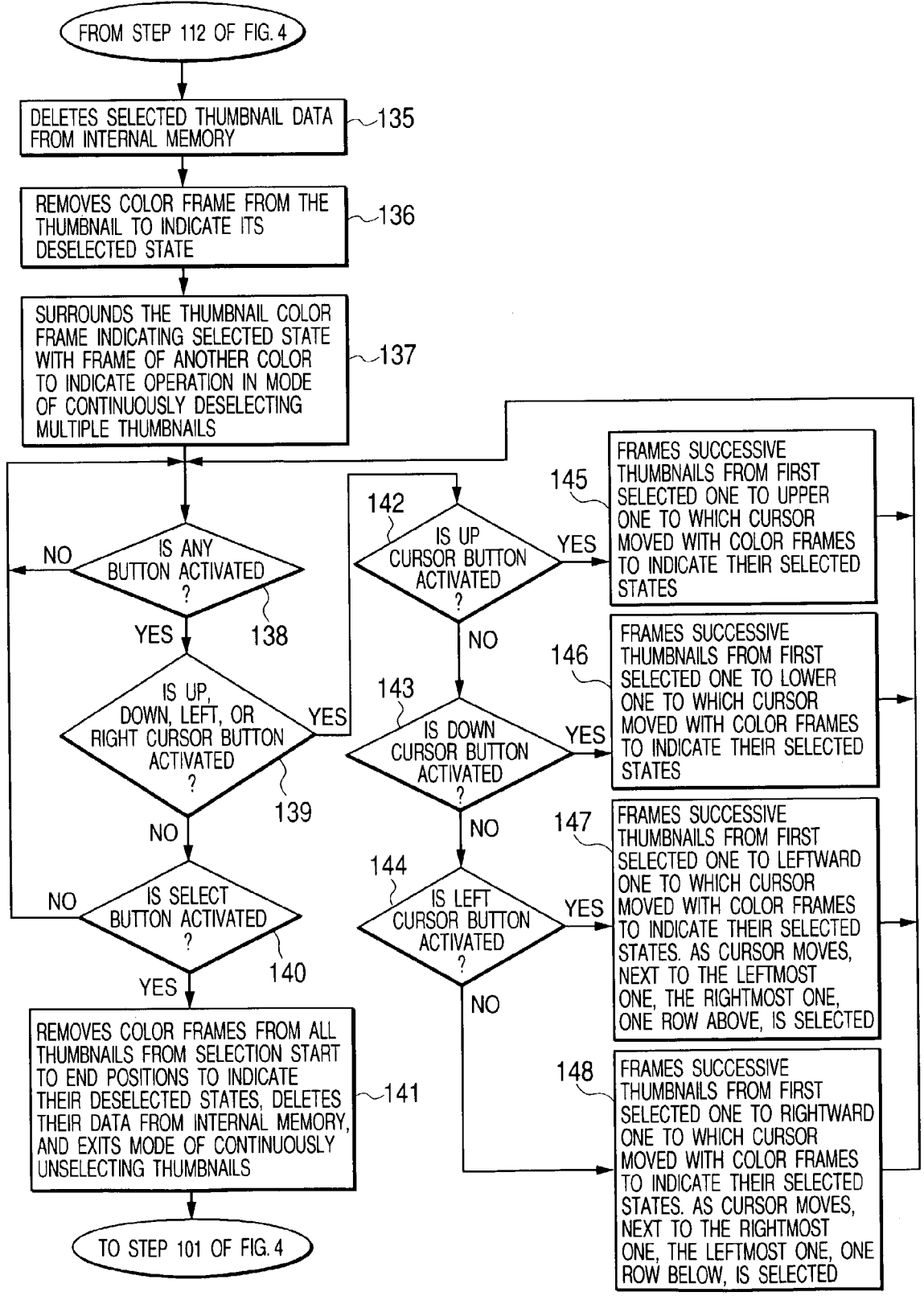
FIG. 12 is a flowchart illustrating an apparatus-internal procedure of continuously unselecting thumbnails according to a preferred embodiment of the invention.

After the step 112 of FIG. 4 to unselect the selected thumbnails continuously, the procedure proceeds to step 135 of FIG. 12.

FIG. 12 is a flowchart illustrating an apparatus-internal procedure of continuously unselecting thumbnails according to a preferred embodiment of the invention. After the step 112 where the equipment entered the mode of unselecting thumbnails that have been selected, in the step 135, the internal controller deletes the data of the thumbnail at the cursor from the internal memory. In step 136, the internal controller removes the color frame around the thumbnail indicating the selected one. In step 137, the internal controller surrounds the thumbnail color frame indicating its selected state with a frame of another color to indicate operation in the mode of continuously unselecting thumbnails. In step 138, the internal controller awaits button activation in the mode of continuously deselecting thumbnails.

What is executed in subsequent steps is essentially the same as is done in the corresponding steps of FIG. 9, but what is executed in step 141 differs from that in the step 125 of FIG. 9. Therefore, detailed explanation of these steps is not repeated. After the step 138, the procedure takes a route through appropriate ones of the steps 139, 140, 142, 143, 144, 145, 146, 147, and 148, and eventually proceeds to the step 141. In the step 141, the internal controller removes the color frames from all thumbnails from the selection start to end positions to indicate their deselected states, deletes their data from the internal memory, and exits the mode of continuously unselecting thumbnails. Then, the procedure returns to the step 101 of FIG. 4 for further button activation.

Figure 13:
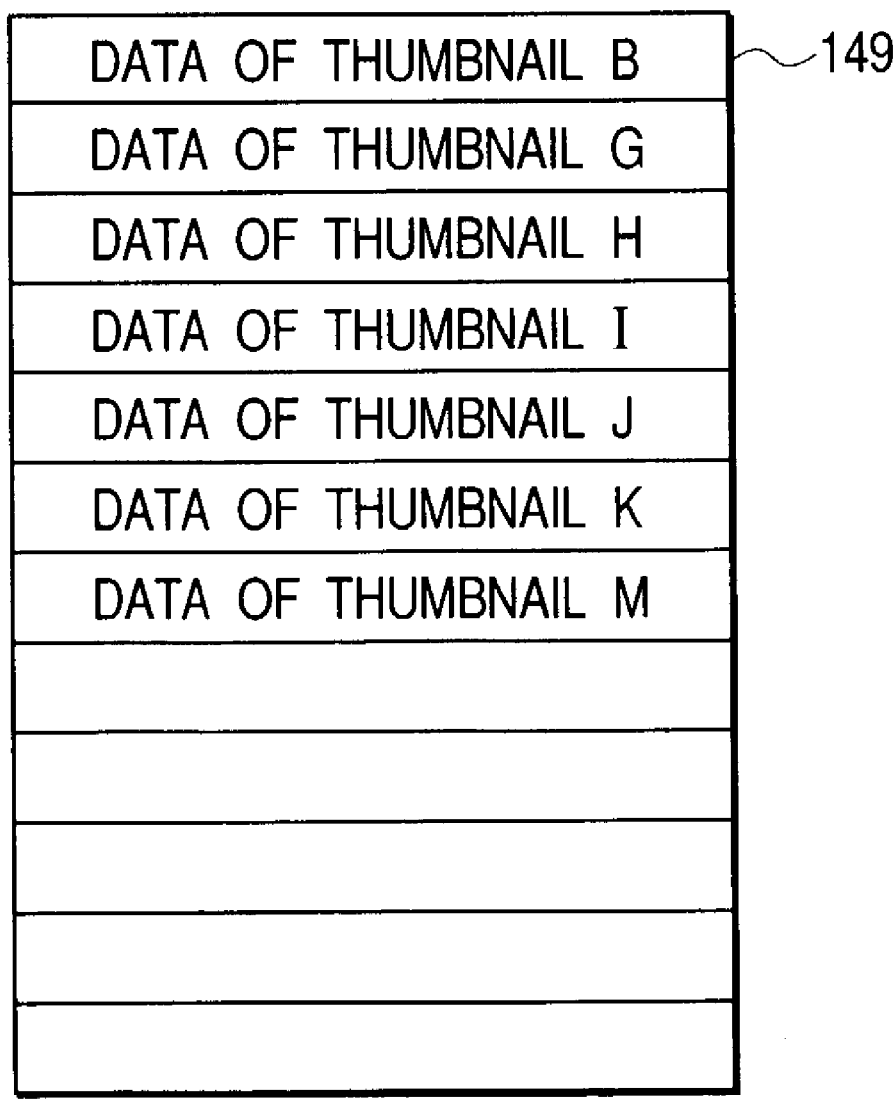
FIG. 13 illustrates the internal memory contents at the start of continuously unselecting thumbnails.

FIG. 13 illustrates the internal memory contents at the start of continuously unselecting thumbnails. As shown, before unselecting multiple thumbnails that have been selected continuously, the internal memory contains the data 149 of thumbnails B, G, H, I, J, K, and M.

Figure 14:
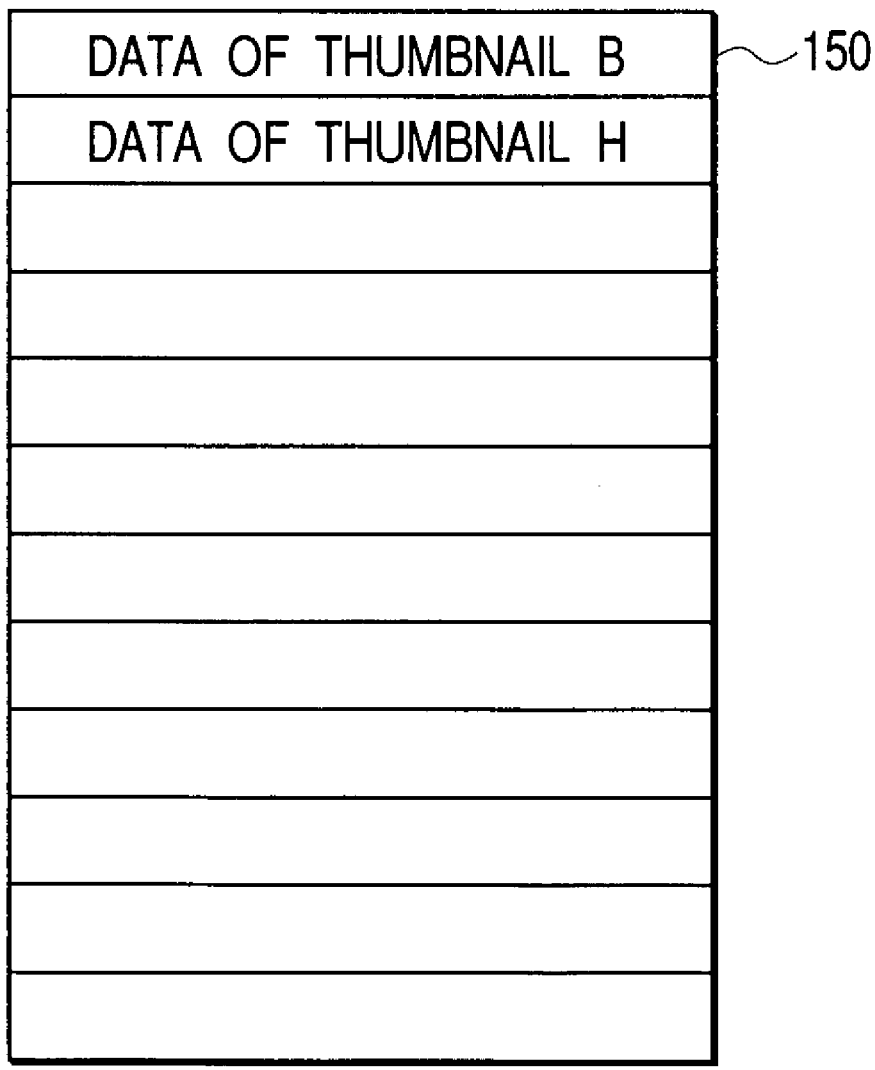
FIG. 14 illustrates the internal memory contents at the end of continuously unselecting thumbnails.

FIG. 14 illustrates the internal memory contents at the end of continuously unselecting thumbnails. At the end of continuously unselecting thumbnails, the internal memory contains only the data 150 of thumbnails B and M because thumbnails G through K have been deleted from the memory data as illustrated in FIG. 13.

While the invention embodied in the digital video recording/reproduction apparatus has been described in this embodiment; the apparatus of the invention may be a video reproduction apparatus capable of displaying an array of thumbnails without the recording function.

While an external storage medium is used in this embodiment, an internal storage medium may be used.

No matter what digital compression method is applied, of course, the invention works equally. The scope of the invention includes the above-mentioned apparatus with the digital video compressor that is based on any digital compression method such as MPEG, JPEG, or DVC.

The window contents to be displayed and the names of the buttons on the control pad are illustrative and other windows and button names are possible.

While the criterion duration of button activation by which the internal controller determines whether a single thumbnail or multiple thumbnails are to be selected is assumed to be two seconds in this embodiment, of course, the criterion duration may be set optionally.

The preferred embodiment of the invention has been described on the assumption that the apparatus has already been equipped with the start and end buttons for recording/reproduction and the internal memory to store thumbnail data. Therefore, these common entities are neither shown in the drawings nor explained.

As described above, according to the invention, the user can select one or more thumbnails from an array of thumbnails displayed on the screen by activating one select button in this manner. To select a single thumbnail, simply depress the button. To select multiple thumbnails continuously, depress the button longer The invention allows for selecting thumbnails without the addition of a new button and dispensing with rather confusing operation with a menu or the like.

As described above, according to the invention, thumbnails can be selected continuously without the addition of a new button.

The invention may be embodied in other specific forms without departing from the spirit or essential characteristics thereof. The present embodiment is therefore to be considered in all respects as illustrative and not restrictive. The scope of the invention being indicated by the appended claims rather than by the foregoing description and all changes which come within the meaning and range of equivalency of the claims are therefore intended to be embraced therein.

What is claimed is:

1. A camera comprising:
   a thumbnail picture arraying part;
   a control pad including a cursor positioning control and a select button operable for selecting at least one thumbnail from an array of thumbnail pictures generated by the thumbnail arraying part;
   a thumbnail selection control which controls the thumbnail arraying part and enables selection of the at least one thumbnail picture according to an output signal from the control pad;
   a display unit which displays the array of thumbnail pictures;
   a timer for measuring a duration of continuously pressing without releasing of the select button;
   wherein, after detecting that the select button is continuously depressed without releasing for longer than a predetermined period, the camera enters a mode of continuously selecting multiple thumbnail pictures, the mode of continuously selecting multiple thumbnail pictures enabling the camera to receive selection of a starting cell and an ending cell of thumbnail pictures after the select button is released, wherein selection of at least one cell of thumbnail pictures that are present between the starting cell and the ending cell is received in response to receiving selection of the starting cell and the ending cell of thumbnail pictures; and
   wherein, when the select button is continuously depressed without releasing for less than the predetermined period, the camera enters a mode of selecting single thumbnail pictures to enable selection of thumbnail pictures one at a time,
   wherein in the mode of continuously selecting multiple thumbnail pictures, the starting cell and the ending cell are selected using the cursor positioning control to designate the starting cell, the ending cell, and the at least one cell of thumbnail pictures between the starting cell and the ending cell, and after designating the starting cell, the ending cell, and the at least one cell of thumbnail pictures between the starting cell and the ending cell, releasing the camera from the mode of continuously selecting multiple thumbnail pictures.

2. A camera according to claim 1 wherein in the mode of selecting single thumbnail pictures, when the select button is continuously depressed without releasing for longer than the predetermined period with the cursor positioned at a selected thumbnail picture, the camera enters a mode of continuously unselecting thumbnail pictures for unselecting successive thumbnail pictures that have been selected.

3. A camera according to claim 1 wherein in the mode of continuously selecting multiple thumbnail pictures, when the select button is continuously depressed without releasing for longer than the predetermined period with the cursor positioned at a selected thumbnail picture, the camera enters a mode of continuously unselecting thumbnail pictures for unselecting successive thumbnail pictures that have been selected.

4. A camera according to claim 2 wherein during the mode of continuously unselecting thumbnail pictures, after selecting a range of successive thumbnail pictures by designating starting and ending cells of thumbnail pictures when the select button is again continuously depressed without releasing, the selected thumbnail pictures are unselected and the camera exits the mode of continuously unselecting thumbnail pictures.

5. A camera according to claim 3 wherein during the mode of continuously unselecting thumbnail pictures, after selecting a range of successive thumbnail pictures when the select button is again continuously depressed without releasing, the selected thumbnail pictures are unselected and the camera exits the mode of continuously unselecting thumbnail pictures.

6. A camera according to claim 1 wherein upon designation of the selected range of thumbnail pictures, the display unit is caused to display the designated thumbnail pictures in a visually different manner than undesignated thumbnail pictures.

7. A camera comprising:
   a reproducing part to reproduce compressed data of digital video signals and thumbnail data corresponding to the compressed data stored on a storage medium;
   a thumbnail arraying part to generate data for displaying thumbnail pictures in an array on one screen page using the thumbnail data;
   a video signal processor which converts the data for displaying thumbnail pictures in an array from the thumbnail arraying part into analog video signals;
   a display unit which displays the array of thumbnail pictures using the analog video signals;
   a control pad including a cursor position control and a select button operable for selecting at least one of the thumbnail pictures from the array;
   an operation control part coupled to receive requests from the control pad;
   a thumbnail selection control part to exert control of thumbnail selection from the array of thumbnail pictures;
   a timer for measuring a duration of continuously pressing without releasing the select button; and
   wherein, after detecting that the select button is continuously depressed without releasing for longer than a predetermined period, the camera enters a mode of continuously selecting multiple thumbnail pictures, the mode of continuously selecting multiple thumbnail pictures enabling the camera to receive selection of a starting cell and an ending cell of thumbnail pictures after the select button is released, wherein selection of at least one cell of thumbnail pictures that are present between the starting cell and the ending cell is received in response to receiving selection of the starting cell and the ending cell of thumbnail pictures; and
   wherein in the mode of continuously selecting multiple thumbnail pictures, the starting cell and the ending cell are selected using the cursor position control to designate the starting cell, the ending cell, and the at least one cell of thumbnail pictures between the starting cell and the ending cell, and after designating the starting cell, the ending cell and the at least one cell of thumbnail pictures between the starting cell and the ending cell, releasing the camera from the mode of continuously selecting multiple thumbnail pictures.

8. A camera according to claim 7 wherein during the mode of continuously selecting multiple thumbnail pictures, after selecting a range of successive thumbnail pictures, when the select button is again continuously depressed without releasing, the selected range is determined and the camera exits the mode of selecting multiple thumbnail pictures.

9. A camera according to claim 7 wherein when the select button is continuously depressed without releasing for longer than a predetermined period with a cursor positioned at a selected thumbnail, the camera enters a mode of continuously unselecting thumbnail pictures to thereby unselect successive thumbnail pictures previously selected.

10. A camera according to claim 9 wherein during the mode of continuously unselecting thumbnail pictures, after selecting a range of successive thumbnail pictures, when the select button is again continuously depressed without releasing, the selected thumbnail pictures in the selected range are unselected and the camera exits the mode of unselecting thumbnail pictures.

11. A camera according to claim 7 wherein upon designation of the selected range of thumbnail pictures, the display unit is caused to display the designated thumbnail pictures in a visually different manner than undesignated thumbnail pictures.

12. A camera comprising:

a thumbnail arraying part;

a control pad including a cursor positioning control and a select button operable for selecting at least one thumbnail from an array of thumbnail pictures generated by the thumbnail arraying part;

a thumbnail selection control which controls the thumbnail arraying part and enables selection of the at least one thumbnail picture according to an output signal from the control pad;

a display unit which displays the array of thumbnail pictures; and a timer for measuring a duration of continuously depressing without releasing of the select button;

wherein, when detecting that the select button is depressed, in the event that the timer measures a duration of continuously depressing without releasing of the select button for less than a predetermined period, the camera enters a mode of selecting single thumbnail pictures, which enables selection for thumbnail pictures, and wherein, when detecting that the select button is depressed, in the event that the timer measures a duration of continuously depressing without releasing of the select button for more than a predetermined period, the camera enters a mode of continuously selecting multiple thumbnail pictures, the mode of continuously selecting multiple thumbnail pictures enabling the camera to receive selection of a starting cell and an ending cell of thumbnail pictures by using the cursor positioning control after the select button is released, whereby multiple thumbnail pictures including the starting cell, the ending cell, and any cells that are present between the starting cell and the ending cell are selected, the camera being released from the mode of continuously selecting multiple thumbnail pictures after the ending cell is selected.

* * * * *